Jan. 2, 1945.    F. W. MEREDITH    2,366,543
GYROSCOPIC NAVIGATIONAL INSTRUMENT
Filed Dec. 21, 1942    2 Sheets-Sheet 1
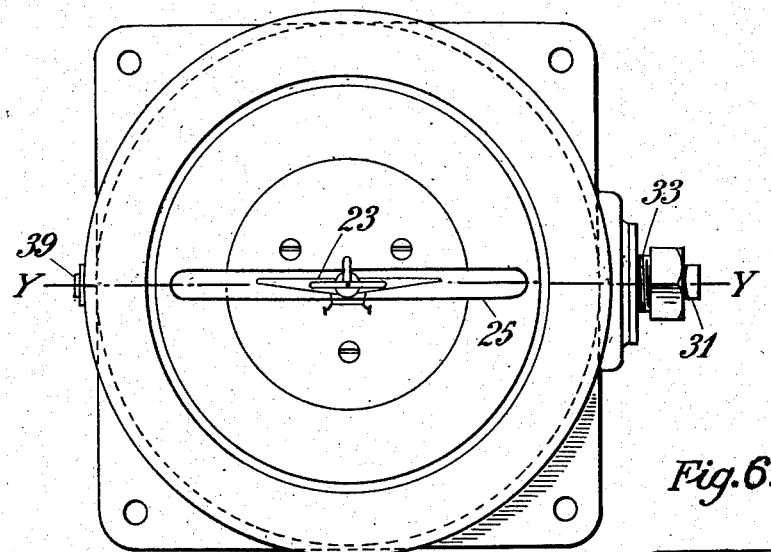
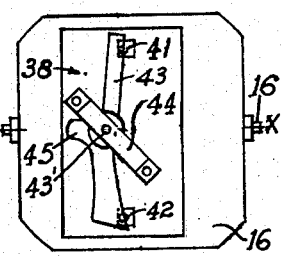
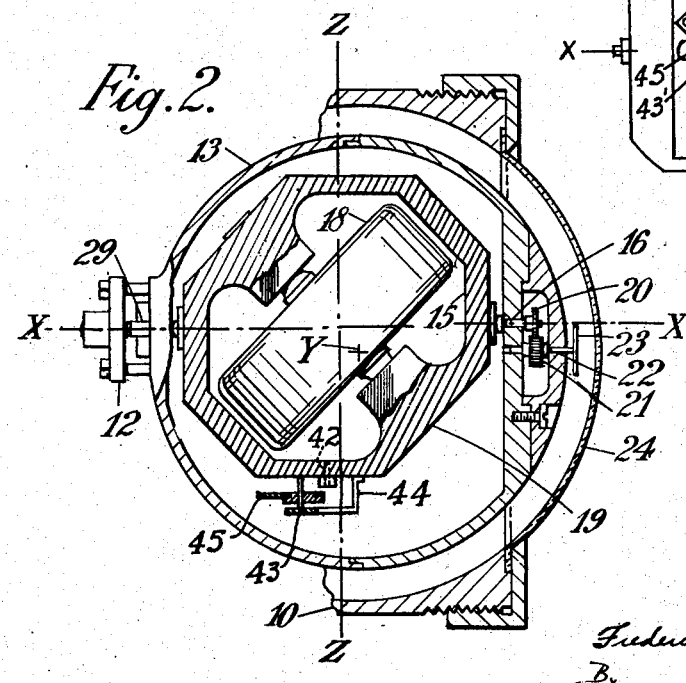

Jan. 2, 1945.  F. W. MEREDITH  2,366,543
GYROSCOPIC NAVIGATIONAL INSTRUMENT
Filed Dec. 21, 1942  2 Sheets-Sheet 2
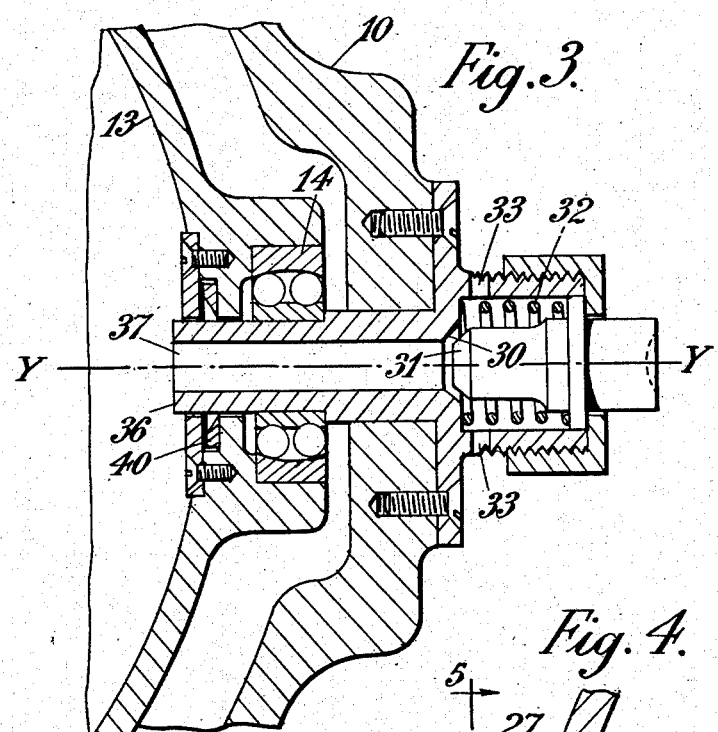
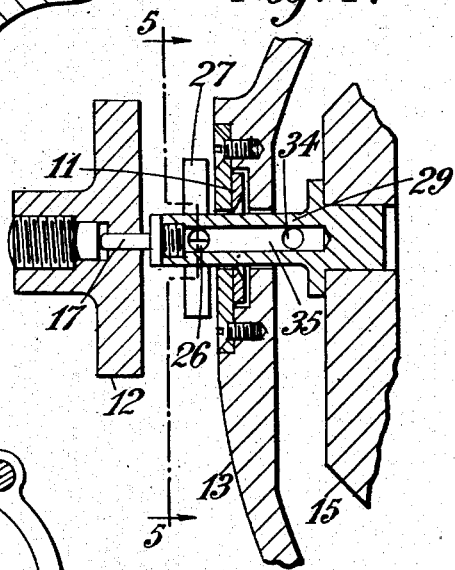
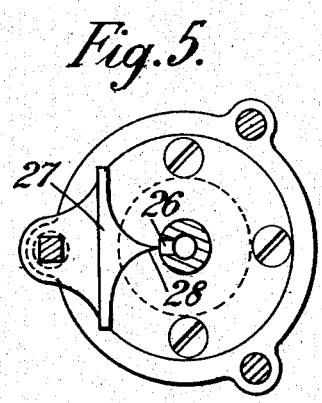

Patented Jan. 2, 1945

2,366,543

UNITED STATES PATENT OFFICE 2,366,543

GYROSCOPIC NAVIGATIONAL INSTRUMENT

Frederick William Meredith, London, England, assignor to S. Smith & Sons (England) Limited, London, England, a company of Great Britain Application December 21, 1942, Serial No. 469,712
In Great Britain September 19, 1941

7 Claims. (Cl. 33—204)

This invention relates to gyroscopic navigational instruments. It is usual to provide a course indicating instrument in the form of a directional gyroscope mounted with the axis of spin of its rotor fore and aft of the aircraft and an indicator which moves from zero on relative movement between the axis of spin and the aircraft about the yaw axis of the aircraft to indicate the amount and direction of the deviation of the aircraft from the proper course. The aircraft will be on its proper course when the indicator is at zero but is not necessarily flying straight on this course since the aircraft may be turning and only on its proper course momentarily. The quickest way for the pilot to bring his aircraft back to its proper course, when it is off its course, is by means of a banked turn, the rate of turn being reduced as the course indicator approaches zero. This requires that the pilot should also refer to a rate-of-turn indicator or an artificial horizon and it is likely that the aircraft will still be turning when it comes on to its course with the result that it will hunt about its course.

One object of this invention is to provide an instrument that will give an indication that is of greater use to a pilot in maintaining course than existing course indicating instruments.

According to the present invention a gyroscopic instrument comprises a base arranged for attachment to the aircraft, a rotor, a universal mounting supporting the rotor on the base with three degrees of rotational freedom, erecting means for bringing the axis of spin to a line which (when the instrument is correctly installed in an aircraft) lies in the plane of symmetry of the aircraft and is inclined both to the axis of flight and to the vertical, and an indicator mounted to move relatively to the base and so interconnected with the universal mounting that it moves in a similar direction from a zero position for corresponding banking and turning movements of the aircraft. By corresponding banking and turning movement is meant that the indicator will move in the same direction when either the aircraft has deviated in one direction without being banked from its course, or is banked whilst still on its course for a turn in the same direction.

With this arrangement the pilot has merely to maintain the indicator at zero to maintain the aircraft on the proper course. If the aircraft deviates from the course or makes a banked turn off course, the indicator will move from zero; the pilot then operates the controls to make a banked turn and bring the indicator to zero. The aircraft will then be making a banked turn in the direction which will bring it back to its course and the rate of turn will be proportional to the angular deviation of the aircraft from its course. As the aircraft returns to its course, the indicator will tend to move to the other side of zero but the pilot will reduce the bank angle and rate of turn so as to keep the indicator at zero and the aircraft will return to level flight on its course without overshooting it. The indicator does not tell the pilot whether the aircraft is banked or not or whether the aircraft is on its course or not, but tells him that it is on, or returning to its course when the indicator is at zero, or is off, or leaving, its course when it has any other setting.

Preferably, said erecting means are so associated with the universal mounting as to maintain the axis of spin of the rotor at a predetermined substantial angle with respect to the vertical but which is less than 90° thereto. The axis of spin will then be inclined to all three principal axes of the aircraft in which the instrument is mounted so that it may be arranged to serve also as a pitch indicator.

In one construction according to this invention the said universal mounting may comprise two gimbal frames, one of which is pivoted on said base to turn about an axis normal to the plane of symmetry of the aircraft, and has said indicator pivoted upon it, while the other of which frames is pivotally mounted in the first said frame to rotate about an orthogonal axis, i. e., the rolling axis of the aircraft, and is so connected to said indicator that the latter is rotated when there is relative movement between said frame, which second frame carries said rotor and is operated upon by pitch erecting means. With this arrangement, the first frame will pivot about its axis relatively to the base when the aircraft climbs or dives, and will move the indicator relatively to the base to give a pitch indication.

A second erecting means responsive to deviations of the axis of spin from the plane of symmetry may be arranged to react upon the outer gimbal frame and control means may be provided which normally maintains said erecting means inoperative or only slowly operative, which control means are either manually or automatically actuated for bringing the second erecting means into operation when a predetermined deviation from course of the aircraft has taken place. This arrangement enables the indicator to be automatically reset after an intentional change of course of the aircraft by a banked turn has been effected, which intentional change of course is usually of such an extent that the movement of the indicator will exceed the predetermined amount so that the second erecting device will operate to reset the rotor to move with the aircraft to the new course. The movement of the indicator, as a result of the aircraft accidentally deviating from a straight course will, however, be less than the predetermined amount, so that the second device will not be operative.

The following is a description of one form of instrument according to this invention, reference being made to the accompanying drawings, in which:

Figure 1 is a face view of the instrument;

Figure 2 is a vertical part-section through the instrument in a fore and aft direction;

Figure 3 is a section through one of the gimbal bearings between the outer frame and the outer casing or base showing a valve for controlling the exhaust of driving air from the casing;

Figure 4 is an enlarged section through the forward bearing of the inner gimbal frame showing a form of erecting device for the rotor;

Figure 5 is a section on the line 5—5 of Figure 4; and

Figure 6 is a bottom plan view, in somewhat diagrammatic form, of the inner casing of the device.

In this construction the instrument comprises a base in the form of an outer casing 10 having a longitudinal axis X—X and a vertical axis of reference Z—Z. The base is arranged for mounting in an aircraft with the longitudinal axis X—X parallel with the fore and aft roll axis of the aircraft and with the Z—Z axis vertical when the aircraft is in level flight. An outer gimbal frame in the form of a hollow sphere 13 is mounted about the axis Y—Y in the outer casing 10 by outer gimbal bearings 14 and 39 which are horizontal and normal to the longitudinal axis of reference. An enclosed casing 15 forming the inner gimbal frame is pivoted in the outer gimbal frame by horizontal gimbal bearings 16 and 17 on the longitudinal axis of reference. It will be seen that the inner frame can turn relatively to the outer frame about the longitudinal axis while the outer frame can turn in the base about a transverse axis. A rotor 18 is mounted in the inner frame to rotate about an axis 19 in the vertical plane containing the two axes of reference X—X and Z—Z and inclined at about 45° to both axes. The front end of this axis, that is, the end which will be in front when the instrument is mounted in an aircraft, is directed upwardly. The rotor is driven by suitable jets, in the casing 15, to which air under pressure is supplied through suitable conduits formed in the casing and the gimbal bearings.

The rear inner gimbal bearing 16 comprises a trunnion fixed to the inner frame and journalled in the outer frame. This trunnion has a gear wheel 20 fixed on it and this wheel meshes with a gear wheel 21 fixed on a shaft 22 that extends outside the outer frame and carries a miniature aircraft 23 on its outer end. This miniature aircraft is visible through a window provided in the outer casing 10 and the window is closed by a domed glass cover 24 provided with a horizon mark 25 which indicates the horizon.

When the aircraft in which the instrument is mounted rolls, the inner frame 15 turns relatively to the outer frame 13 about the inner gimbal bearings 16 and 17 and tilts the miniature aircraft relatively to the outer frame and therefore to the horizon mark 25 on the glass cover 24. The gearing 20, 21 connecting the miniature aircraft to the inner frame serves to reverse the direction of movement of the miniature aircraft relatively to the outer frame 15 as compared with that of the inner frame 15 relatively to the outer frame so that the miniature aircraft is tilted with respect to the horizon mark 25 in the same direction as the actual aircraft is tilted with respect to the real horizon. If the aircraft climbs or dives, the outer frame 13 will turn relatively to the outer casing 10 about the bearings 14 and 39 and will raise the miniature aircraft above, or move it below, the horizon mark 25. It will be seen that the present instrument gives an indication of the attitude of the aircraft in which it is mounted similar to the indication of existing artificial horizon instruments and it can be used in the same way to maintain level flight. The present instrument has an additional property not possessed by former instruments and this property will now be explained.

If the aircraft is turned off its course about its yaw axis, the spin axis 19 of the rotor will be turned about a vertical axis Z—Z relatively to the base or outer casing 10. This rotation is provided partly by rotation of the inner frame 15 relatively to the outer frame 13 about the inner gimbal bearings 16 and 17 and partly by rotation of the outer frame 13 relatively to the base about the outer gimbal bearings 14. For small angles of yaw, the rotation about the outer gimbal bearing is negligible and the rotation about the inner gimbal bearings results in the miniature aircraft being tilted relatively to the horizon mark as though the aircraft were banked. The arrangement is such that the angle of tilt of the miniature aircraft is proportional to the angle by which the aircraft has turned off its course, that is, to the angle between the fore and aft axis of the aircraft and the vertical plane containing the spin axis of the rotor, and the direction of tilt corresponds to the direction in which the aircraft would have to be banked to make a banked turn off its proper course on to its actual course. Figure 2 shows the approximate normal position of the parts. It will be understood that the aircraft can be brought back to its true course by making a banked turn in the opposite direction to that indicated by the tilt of the miniature aircraft and this may be done by operating the controls of the aircraft so as to bring the miniature aircraft level with the horizon mark and to keep it in that position. The aircraft will then make a banked turn back on to its course and the rate of turn will be reduced automatically as the aircraft reaches its proper course so that the aircraft will return to course without hunting.

The pilot uses the present instrument in the same way as he would use an artificial horizon instrument to maintain level flight but, in so doing, he is maintaining his aircraft on a set course or is taking the correct action to return to the set course if he is off course. The pilot cannot tell from the instrument whether or not he is flying level or is banked or whether he is on or off course but he can tell that he is either off course or banked to turn off course if the miniature aircraft appears tilted, or is on course or returning to course if the miniature aircraft appears horizontal.

It is necessary to maintain the spin axis 19 of the rotor 18 tilted at the proper angle to the vertical. This is done by an erecting device 38 which comprises a horizontal shutter and jets arranged at the bottom of the inner frame 15 in the manner described in United States application Serial No. 390,398, of H. E. Whatley, filed April 25, 1941. The air used to drive the rotor escapes from the inner frame into the outer frame through the jets of this device. If the spin axis departs from the proper angle to the vertical, this device operates to apply a torque, derived from the reaction of the jets, about the inner gimbal axis so as to precess the rotor axis back to its correct position relatively to the vertical. The erecting device 38, following the disclosure of the above mentioned application, is illustrated diagrammatically in Figures 2 and 6 of the drawings. Air under the usual degree of pressure, is allowed to escape from the interior of the inner casing 15 through two jets or nozzles 41 and 42, one disposed upon either side of the axis x—x. A shutter 43 is pivotally mounted adjacent its mid point as at 43', within a frame 44 which is secured by suitable means to the casing. The arrangement is such that the two end portions of the shutter controls the jets so that in mid position a part of each jet is uncovered. The shutter is provided with a projecting portion 45 near its center and the force of gravity tends to oscillate the shutter whenever the inner frame 16 moves about the axis x—x. Upon rotation of the shutter in one direction, one jet tends to close and the other to be opened. The reactive forces of the unequal jets then serve to restore the casing and maintain it in the angular position desired.

A second erecting device is associated with the front inner gimbal bearing. This bearing consists of a journal 17 mounted in an external bracket 12 carried on the outer gimbal frame 13. The journal is an extension of a trunnion 29 which is fixed to the inner gimbal frame 15 and which passes through the outer gimbal frame 13. The trunnion is provided with a sealing ring 11 to prevent leakage through the clearing hole in frame 13. A passage 35 is formed in trunnion 29 from the space within the outer frame to outside that frame and the outer end of this passage is provided with a horizontally directed port 26, the axis of which is normal to the axis of the trunnion. The air used to drive the rotor escapes from the outer frame through hole 34 and passage 35 and is directed as a jet through port 26 against a reaction member 27 which is secured on the outside of the outer frame 13. The reaction member has a knife-edge 28 against which the jet is directed and the two surfaces of the knife-edge are curved so that the part of the jet passing one side of the knife-edge is directed vertically upwards while the part of the jet passing the other side of the knife-edge is directed vertically downwards. So long as the spin axis of the rotor lies in the plane containing the two axes of reference, the knife-edge divides the jet equally and there is no resultant jet reaction. If the spin axis leaves this plane, the jet is directed more to one side of the knife-edge than to the other and there is a resultant jet reaction either upwardly or downwardly to apply a torque to the outer frame about its gimbal bearings. This causes the inner frame to precess and bring the spin axis back into the plane of the axes of reference. As seen in Figure 3, one outer gimbal bearing 14 is located on a tubular trunnion 36 fixed to the outer casing or base 10 and consists of a ball bearing housed in the outer frame 13. Trunnion 36 is also provided with a sealing ring 40 to prevent leakage through the bearing 14. The outer end of the throughway 37 in this trunnion forms a seating 30 for a valve 31 which is held from its seating by a spring 32 but which can be closed manually by the pilot. Part of the driving air escapes from the outer frame through this trunnion and ports 33 so that only part of the driving air passes through the second erecting device which operates to erect the spin axis very slowly so as not to interfere with the operation of the instrument in response to rotation of the aircraft about its yaw axis as explained previously.

If the pilot wishes to change the course of the aircraft, he makes a banked turn on to the new course and then holds the aircraft on the new course by compass. He also closes the valve 31 in the outer gimbal trunnion so that the whole of the driving air must pass through the second erecting device. The effect of the banked turn is to cause the spin axis to leave the plane of the axis of reference and thus to bring the second erecting device into action to restore the spin axis to that plane. The miniature aircraft is also tilted. The second erecting device precesses the spin axis back into the proper vertical plane in the instrument rapidly, owing to the increased air flow through the device, and the miniature aircraft returns to its horizontal position during this precession. When the miniature aircraft is again horizontal, the valve is allowed to open and the pilot keeps on the new course by maintaining the miniature aircraft horizontal as described previously The restriction of the flow through the ports 33 may be made automatic by a suitably ported shutter attached to the inner gimbal frame 15 which cooperates with the inner end of the passageway 37 through the hollow trunnion so as to restrict the flow when the banking indication exceeds a prescribed amount.

It should be noted that the inclination of the spin axis to the fore and aft axis of the aircraft will vary in flight depending on whether the aircraft is flying level or is climbing or diving The inclination of the spin axis to the vertical should be so selected that the spin axis does not become parallel to the fore and aft axis of the aircraft when the latter is climbing at its maximum rate, otherwise the instrument would cease to indicate roll. Apart from this, the inclination of the spin axis is not critical.

I claim:

1. A gyroscopic instrument comprising a base arranged for attachment to an aircraft, a rotor, a universal mounting supporting the rotor on the base with three degrees of rotational freedom, erecting means adapted to bring the axis of spin of the rotor to a line which (when the instrument is correctly installed in an aircraft) lies in the plane of symmetry of the aircraft and is inclined both to the axis of flight and to the vertical, the upper end of said axis being tilted forwardly and an indicator mounted to move relatively to the base and so interconnected with the universal mounting that it moves in a similar direction from a zero position for corresponding banking and turning movements of the aircraft.

2. A gyroscopic instrument comprising a base arranged for attachment to an aircraft, a rotor, a universal mounting supporting the rotor on the base with three degrees of rotational freedom, erecting means adapted to bring the axis of spin of the rotor to a line which (when the instrument is correctly installed in an aircraft) lies in the plane of symmetry of the aircraft and is inclined at a pre-determined substantial angle with respect to the vertical and less than 90° thereto, the upper end of said axis being tilted forwardly, the said angle of inclination however being smaller than that which would cause the spin axis to become parallel with the fore and aft axis of the aircraft when the latter is climbing at its maximum rate and an indicator mounted to move relatively to the base and so interconnected with the universal mounting that it moves in a similar direction from a zero position for corresponding banking and turning movements of the aircraft.

3. A gyroscopic instrument comprising a base, an outer gimbal frame rotatably mounted on the base so as to turn about an axis normal to the plane of symmetry of an aircraft, an inner gimbal frame rotatably mounted in the outer frame to turn about an orthogonal axis, a gyroscope rotor rotatably mounted in the inner frame, erecting means operatively connected with the inner frame for bringing the axis of spin of the rotor to a line which (when the instrument is correctly installed in an aircraft) lies in the plane of symmetry of the aircraft and is inclined both to an axis of flight and to the vertical, an indicator pivoted on the outer frame, a transmission between the inner and outer frames, whereby relative movement between these frames is transmitted to said indicator, and a second erecting means operatively connected with the outer gimbal frame, which means is responsive to deviations of the axis of spin from the plane of symmetry and is adapted to react upon the outer gimbal frame, and control means for bringing said second erecting means into or out of operation.

4. A gyroscopic instrument comprising a base, an outer gimbal frame rotatably mounted on the base so as to turn about an axis normal to the plane of symmetry of an aircraft, an inner gimbal frame rotatably mounted in the outer frame to turn about an orthogonal axis, a gyroscope rotor rotatably mounted in the inner frame, erecting means operatively connected with the inner frame for bringing the axis of spin of the rotor to a line which (when the instrument is correctly installed in an aircraft) lies in the plane of symmetry of the aircraft and is inclined both to an axis of flight and to the vertical, an indicator carried by said outer frame, a transmission between the inner and outer frames, whereby relative movement between these frames is transmitted to said indicator, a second erecting means operatively connected with the outer gimbal frame, which means is responsive to deviations of the axis of spin from the plane of symmetry and is adapted to react upon the outer gimbal frame, and manually operated control means for bringing said second erecting means into or out of operation.

5. A gyroscopic instrument comprising a base, an outer gimbal frame rotatably mounted on the base so as to turn about an axis normal to the plane of symmetry of an aircraft, an inner gimbal frame rotatably mounted in the outer frame to turn about an orthogonal axis, a gyroscope rotor rotatably mounted in the inner frame, erecting means operatively connected with the inner frame for bringing the axis of spin of the rotor to a line which (when the instrument is correctly installed in an aircraft) lies in the plane of symmetry of the aircraft and is inclined both to an axis of flight and to the vertical, an indicator pivoted on the outer frame, a transmission between the inner and outer frames, whereby relative movement between these frames is transmitted to said indicator, a second erecting means operatively connected with the outer gimbal frame, which means is responsive to deviations of the axis of spin from the plane of symmetry and is adapted to react upon the outer gimbal frame, and control means adapted automatically to bring the second erecting means into operation after a predetermined deviation from course.

6. A gyroscopic instrument comprising a base, an outer gimbal frame rotatably mounted on the base so as to turn about an axis normal to the plane of symmetry of an aircraft, an inner gimbal frame rotatably mounted in the outer frame to turn about an orthogonal axis, a gyroscope rotor rotatably mounted in the inner frame, erecting means operatively connected with the inner frame for bringing the axis of spin of the rotor to a line which (when the instrument is correctly installed in an aircraft) lies in the plane of symmetry of the aircraft and is inclined both to an axis of flight and to the vertical, an indicator pivoted on the outer frame, a transmission between the inner and outer frames, whereby relative movement between these frames is transmitted to said indicator and a second erecting means operatively connected with the outer gimbal frame, which means is responsive to deviations of the axis of spin from the plane of symmetry and is adapted to react upon the outer gimbal frame, said second named erecting device including an opening for discharging a reaction jet of air from said outer gimbal frame, another discharge opening in said outer gimbal frame, an opening for supplying air under pressure to said outer gimbal frame, the frame being substantially air-tight except for the said supply and discharge openings, and a valve in said second discharge opening for controlling the escape of air from the frame and thus controlling the operation of the jet discharge erecting device.

7. A gyroscopic instrument comprising a base, an outer gimbal frame rotatably mounted on the base so as to turn about an axis normal to the plane of symmetry of an aircraft, an inner gimbal frame rotatably mounted in the outer frame to turn about an orthogonal axis, a gyroscope rotor rotatably mounted in the inner frame, erecting means operatively connected with the inner frame for bringing the axis of spin of the rotor to a line which (when the instrument is correctly installed in an aircraft) lies in the plane of symmetry of the aircraft and is inclined both to an axis of flight and to the vertical, an indicator pivoted on the outer frame, a transmission between the inner and outer frames, whereby relative movement between these frames is transmitted to said indicator, and a second erecting means operatively connected with the outer gimbal frame, which means is responsive to deviations of the axis of spin from the plane of symmetry and is adapted to react upon the outer gimbal frame, said second named erecting device including an opening for discharging a reaction jet of air from said outer gimbal frame, another discharge opening in said outer gimbal frame at one of its axial mountings, an opening for supplying air under pressure to said outer gimbal frame, the frame being substantially air-tight except for the said supply and discharge openings, and a spring pressed manually operated valve in said second discharge opening for controlling the escape of air from the frame and thus controlling the operation of the jet discharge erecting device.

FREDERICK WILLIAM MEREDITH.